United States Patent
Fried

[15] 3,669,839

[45] June 13, 1972

[54] STIMULATORY EFFECT OF ORGANIC ACIDS IN CITRIC ACID FERMENTATION

[72] Inventor: John H. Fried, Waterford, Conn.
[73] Assignee: Pfizer Inc., New York, N.Y.
[22] Filed: Dec. 9, 1970
[21] Appl. No.: 96,623

[52] U.S. Cl. ................................195/37, 195/114, 195/30
[51] Int. Cl. .......................................................C12d 1/04
[58] Field of Search ..................195/36 R, 37, 28, 29, 30, 47, 195/114

[56] References Cited

UNITED STATES PATENTS 3,372,094  3/1968  Gold et al............................195/36 R

FOREIGN PATENTS OR APPLICATIONS 6,820,707  9/1968  Japan

*Primary Examiner*—A. Louis Monacell
*Assistant Examiner*—Gary M. Nath
*Attorney*—Connolly and Hutz

[57] ABSTRACT

A process for producing citric acid with certain Candida strains by aerobically fermenting an aqueous carbohydrate-containing nutrient medium in the presence of an added aliphatic tricarboxylic acid such as n-hexadecylcitric acid or trans-aconitic acid.

3 Claims, No Drawings

STIMULATORY EFFECT OF ORGANIC ACIDS IN CITRIC ACID FERMENTATION

BACKGROUND OF THE INVENTION

This invention relates to a method for increasing the yield of citric acid by citric acid-accumulating strains of Candida by the addition of a tricarboxylic acid, or derivatives thereof, in its production of citric acid with comprises propagating a citric acid-accumulating strain of the genus Candida in an aqueous nutrient medium to which is added an aliphatic tricarboxylic acid such as n-hexadecylcitric acid or trans-aconitic acid, and recovering therefrom the accumulated citric acid.

Because of its ease of assimilation, palatability and low toxicity, citric acid is one of the most widely used acids in the food and pharmaceutical industry. Improved processes for its production are of considerable commercial importance.

SUMMARY OF THE INVENTION

It has been discovered that Candida strains that have the ability to accumulate citric acid will accumulate even larger amounts of citric acid by the addition of n-hexadecylcitric acid or trans-aconitic acid to the fermentation media at levels of at least about 100 ppm w/v.

DETAILED DESCRIPTION OF THE INVENTION

The process of this invention is conveniently carried out by first preparing an inoculum of the appropriate Candida culture. The Candida inoculum may be prepared by propagating the Candida cells from a slant under aerobic conditions in an aqueous fermentation medium containing an assimilable carbohydrate, generally glucose; and assimilable nitrogen source, preferably peptone; and sodium chloride. The broth is agitated at room temperature for about 24 hours at which time the pH is usually about 4.5. The rate of growth of the Candida cells is periodically determined by centrifuging the broth for 15 minutes at about 2,000 g. Generally, a Candida cell density (spindown) of 0.5 ml. of Candida cells per 15 ml. of broth is preferred before the broth is used for inoculation.

After determining that the inoculum culture is of suitable Candida cell density, a portion of it is added to the aqueous fermentation medium which contains a carbohydrate, source of assimilable nitrogen and lead acetate. We prefer such carbohydrates as potato or corn starch, molasses, sucrose, glucose, maltose, dextrin, fructose, and galactose. Because of its availability and low cost, we generally prefer to use a molasses as the carbohydrate source, and we use amounts equivalent to as much as 28 percent by weight of sugar.

As an available nitrogen source, such nitrogen-containing organic materials as wheat bran, soybean meal, cotton seed meal, urea, amino acids, peptones and enzymatically digested proteins can be used. We have found the commercially available product YTT, a casein source available from the Sheffield Chemical Company, Norwich, N.Y., to be a convenient source of assimilable nitrogen. We generally use from 1 to 20 grams of this peptone source per liter of medium. Inorganic compounds may also serve as sources of assimilable nitrogen. Of these we prefer ammonium nitrate, ammonium sulfate and ammonium chloride.

The following mineral cations and anions are considered beneficial for the growth of Candida: sodium, potassium, cobalt, phosphate and sulfate. It is well known that trace amounts of various vitamins such as biotin also play a role in cell growth. Most of these trace vitamins and essential minerals are present as impurities in the crude nitrogen and carbon sources, and consequently, it is not usually necessary to add them individually to the fermentation medium. Calcium carbonate also promotes the growth of Candida cells and is generally added to the medium.

The aliphatic tricarboxylic acid, or a derivative thereof, is added to the fermentation media at a concentration of at least 100 ppm w/v, a concentration which provides about a 35 percent increase or more in citric acid yield. Concentrations up to about 2,000 ppm w/v or more may be used but are without practical advantage. It is understood that the use n-hexadecylcitric acid or transaconitic acid includes a potential source of these acids such as the alkali metal, alkaline earth salts, i.e., the sodium, potassium, calcium, magnesium or ammonium salts; derivatives such as esters, amides, nitriles or other compounds which are converted to the free acid or its salts during the fermentation process.

The fermentation, after inoculation, is allowed to proceed aerobically, usually for about 116 hours, with agitation, at a temperature from about 20° to 37° C., although a temperature of about 28° C. is preferred. Compressed sterile air is forced through the fermentation medium at about 6 cubic feet per hour per gallon of medium. The citric acid is recovered by the conventional methods known to those skilled in the art.

The present invention embraces not only the use of the herein described organisms but also of mutants thereof produced by such measures as treatments with X-rays, ultraviolet light, nitrogen mustard and the like.

The following examples are merely illustrative and are not intended to limit the invention, the scope of which is defined by the appended claims.

EXAMPLE I

PREPARATION OF INOCULUM

A slant containing Candida cells is transferred to a liquid medium prepared from 150 g. of Cerelose, available from Corn Products Sales Co., New York, N.Y. 10022, 15 g. of peptone, 5 g. of yeast extract, 4 g. of sodium chloride, and 1 liter of water. The Candida cells are incubated aerobically with agitation at room temperature for 24 hours. At the end of this time, the pH is about 4.5. The Candida cell content of the medium (spindown) is determined by centrifuging a 15 ml. sample of the medium at 2,000 g. for 15 minutes. When a Candida cell density of 0.5 ml. of yeast cells per 15 ml. of fermentation medium is realized, the cell suspension is used to inoculate the appropriate fermentation medium.

Several ml. of 24 hours-old inoculum, of the citric acid accumulating yeast *Candida guilliermondii* ATCC No. 9058 prepared as described above, are added to an aqueous nutrient medium containing per liter of medium the following ingredients: 270 g. of crude sugar from cane molasses; 3.0 g. of cotton seed meal; 13.0 g. of calcium carbonate; 10.0 g. of urea and 200 ppm w/v of n-hexadylcitric acid. The medium is autoclaved for 30 minutes at 110° C.

Two liters of this medium is stirred at 1,625 rpm, aerated at 6 cubic feet of air per hour per gallon of medium and incubated at 28° C. Lead acetate (1.0 g./liter) is added about 9 hours after inoculation.

After a fermentation period of approximately 116 hours, the citric acid concentration is 113 g./liter as compared with 73 g./liter for the control medium (without added n-hexadecylcitric acid).

EXAMPLE II

The process of example I is repeated with trans-aconitic acid in place of n-hexadecylcitric acid. The citric acid concentration after 116 hours is 105 g./liter as compared to 73 g./liter for the control medium (without added trans-aconitic acid), and is recovered.

EXAMPLE III

Examples I and II are repeated with comparable results using an aqueous nutrient medium containing the following ingredients per liter of medium: an amount of cane black strap molasses equivalent to about 150 grams of glucose; calcium carbonate, 5.0 grams; YTT, 1.0 grams; lead acetate, 1.0 grams; n-hexadecylcitric acid, 100 ppm w/v.

YTT is a commercial source of nitrogen available from the Sheffield Chemical Company, Norwich, N.Y., and comprises peptones obtained from the degradation of casein.

EXAMPLE IV

The process of example III is repeated using trans-aconitic acid in place of n-hexadecylcitric acid, with comparable results.

EXAMPLE V

The process of examples I and II are repeated in turn with at least one of the following Candida strains in place of *Candida guillermondii* ATCC No. 9058, with comparable results:

| *Candida* Strain | ATCC Culture No. |
|---|---|
| krusoides | 7345 |
| lipolytica | 8662 |
| lipolytica | 8661 |
| melinii | 10568 |
| monosa | 2146 |
| monosa | 9330 |
| mycoderma | 9888 |
| parapsilosis | 7330 |
| parapsilosis | 7333 |
| parapsilosis | 7336 |
| parapsilosis | 10265 |
| lipolytica | 9773 |
| albicans | 753 |

| *Candida* Strain | ATCC Culture No. |
|---|---|
| parapsilosis | 7336 |
| parapsilosis | 10265 |
| pelliculosa | 2149 |
| albicans | 20032 |
| albicans | 753 |
| albicans | 2091 |
| albicans | 10259 |
| albicans | 10261 |
| albicans | 11651 |
| albicans | 14053 |
| brumptii | 10564 |
| catenulata | 10565 |
| curvata | 10567 |
| flareri | 9375 |
| guilliermondii | 9390 |
| guilliermondii | 14242 |
| japonica | 14437 |
| krusei var. saccharicola | 16047 |

What is claimed is:

1. In a process for producing citric acid by aerobically cultivating a citric acid-accumulating strain of Candida in an aqueous carbohydrate-containing nutrient medium, the improvement which comprises conducting the fermentation in the presence of an aliphatic tricarboxylic acid at a concentration of at least about 100 ppm w/v, wherein said tricarboxylic acid is n-hexadecylcitric acid or trans-aconitic acid, and recovering said citric acid.

2. The process of claim 1 wherein said citric acid-accumulating strain of Candida is *Candida guilliermondii*, ATCC No. 9058.

3. The process of claim 1 wherein said citric acid-accumulating strain of Candida is at least one of the following:

| *Candida* Strain | ATCC Culture No. |
|---|---|
| krusoides | 7345 |
| lipolytica | 8661 |
| lipolytica | 8662 |
| lipolytica | 9773 |
| melinii | 10568 |
| monosa | 2146 |
| monosa | 9330 |
| mycoderma | 9888 |
| parapsilosis | 7330 |
| parapsilosis | 7333 |
| pelliculosa | 2149 |
| albicans | 752 |
| albicans | 753 |
| albicans | 20032 |
| albicans | 2091 |
| albicans | 10259 |
| albicans | 10261 |
| albicans | 11651 |
| albicans | 14053 |
| brumptii | 10564 |
| catenulata | 10565 |
| curvata | 10567 |
| flareri | 9375 |
| guilliermondii | 9390 |
| guilliermondii | 14242 |
| japonica | 14437 |
| krusei var. saccharicola | 16047 |

* * * * *